US012700227B2

(12) United States Patent
Tsimpoukelli et al.

(10) Patent No.: US 12,700,227 B2
(45) Date of Patent: Aug. 4, 2026

(54) MULTIMODAL FEW-SHOT LEARNING WITH FROZEN LANGUAGE MODELS

(71) Applicant: GDM Holding LLC, Mountain View, CA (US)

(72) Inventors: Maria Rafailia Tsimpoukelli, London (GB); Jacob Lee Menick, London (GB); Serkan Cabi, London (GB); Felix George Hill, London (GB); Seyed Mohammadali Eslami, London (GB); Oriol Vinyals, London (GB)

(73) Assignee: GDM Holding LLC, Mountain View, CA (US)

( * ) Notice: Subject to any disclaimer, the term of this patent is extended or adjusted under 35 U.S.C. 154(b) by 150 days.

(21) Appl. No.: 18/568,561

(22) PCT Filed: Jun. 8, 2022

(86) PCT No.: PCT/EP2022/065502
§ 371 (c)(1),
(2) Date: Dec. 8, 2023

(87) PCT Pub. No.: WO2022/258666
PCT Pub. Date: Dec. 15, 2022

(65) Prior Publication Data
US 2024/0282094 A1     Aug. 22, 2024

(30) Foreign Application Priority Data
Jun. 8, 2021     (GR) .............................. 20210100374

(51) Int. Cl.
G06V 10/82      (2022.01)
G06F 40/284     (2020.01)
G06V 20/70      (2022.01)

(52) U.S. Cl.
CPC ............ G06V 10/82 (2022.01); G06F 40/284 (2020.01); G06V 20/70 (2022.01)

(58) Field of Classification Search
CPC ...... G06V 10/82; G06V 20/70; G06V 30/268; G06V 10/80; G06F 40/284; G06N 3/045;
(Continued)

(56) References Cited

U.S. PATENT DOCUMENTS 10,445,431 B1    10/2019  Lev-Tov et al.
2020/0125944 A1    4/2020  Jauhar et al.
(Continued)

FOREIGN PATENT DOCUMENTS

CN          112861995  A       5/2021

OTHER PUBLICATIONS

Sanghyun Seo and Juntae Kim, "Image-Text Embedding with Hierarchical Knowledge for Cross-Modal Retirieval", Published Dec. 8, 2018, https://doi.org/10.1145/3297156.32972 (Year: 2018).*
(Continued)

*Primary Examiner* — Charlotte M Baker
(74) *Attorney, Agent, or Firm* — Fish & Richardson P.C.

(57)                ABSTRACT
Methods, systems, and apparatus, including computer programs encoded on computer storage media, for processing multi-modal inputs using language models. In particular, the inputs include an image, and the image is encoded by an image encoder neural network to generate a sequence of image embeddings representing the image. The sequence of image embeddings is provided as at least part of an input sequence to that is processed by a language model neural network.

20 Claims, 6 Drawing Sheets

(58) Field of Classification Search
 CPC ...... G06N 3/0455; G06N 3/0464; G06N 3/09;
  G06N 3/084; G06N 3/096; G06N 3/0895
 USPC ......................................................... 382/157
 See application file for complete search history.

(56) References Cited

U.S. PATENT DOCUMENTS

| | | |
|---|---|---|
| 2020/0242736 A1 | 7/2020 | Liu et al. |
| 2020/0380403 A1 | 12/2020 | Aggarwal et al. |
| 2021/0012199 A1 | 1/2021 | Zhang et al. |

OTHER PUBLICATIONS

Luo, "Exploration on Grounded Word Embedding: Matching Words and Images with Image-Enhanced Skip-Gram Model," CoRR, Sep. 8, 2018, arxiv.org/abs/1809.02765, 6 pages.
Office Action in Indian Appln. No. 202327061648, mailed on May 5, 2025, 7 pages.
Office Action in Canadian Appln. No. 3,214,735, dated Nov. 28, 2024, 5 pages.
Office Action in Japanese Appln. No. 2023-561364, dated Dec. 16, 2024, 11 pages (with English translation).
Qi et al., "ImageBERT: Cross-modal Pre-training with Large-scale Weak-supervised Image-Text Data," CoRR, Jan. 23, 2020, arXiv:2001. 07966v2, 12 pages.
Su et al., "VL-BERT: Pretraining of Generic Visual-Lingguistic Representations," CoRR, Feb. 18, 2020, arXiv:1908.08530v4, 16 pages.
Adiwardana et al., "Towards a human-like open-domain chatbot," CoRR, Jan. 27, 2020, arxiv.org/abs/2001.09977, 38 pages.
Brown et al., "Language models are few-shot learners," CoRR, Jul. 22, 2020, arXiv:2005.14165, 75 pages.
International Preliminary Report on Patentability in International Appln. No. PCT/EP2022/065502, dated Dec. 21, 2023, 9 pages.
International Search Report and Written Opinion in International Appln. No. PCT/EP2022/065502, dated Oct. 7, 2022, 14 pages.
Lu et al., "ViLBERT: Pretraining Task-Agnostic Visiolinguistic Representations for Vision- and-Language tasks," CoRR, arXiv:1908. 02265v1, dated Aug. 6, 2019, 11 pages.
Office Action in Australian Appln. No. 2022288746, dated Dec. 4, 2023, 3 pages.
Raffel et al., "Exploring the limits of transfer learning with a unified text-to-text transformer," The Journal of Machine Learning Research, Jan. 1, 2020, 21(1):5485-5551.
Vaswani et al., "Attention is all you need," 31st Conference on Neural Information Processing Systems 30, 2017, 11 pages.
Notice of Acceptance for Patent Application in Australian Appln. No. 2022288746, dated Jul. 9, 2024, 3 pages.
Office Action in European Appln. No. 22735099.8, dated Aug. 7, 2024, 12 pages.
Sun et al., "VideoBERT: A Joint Model for Video and Language Representation Learning," CoRR, Apr. 3, 2019, arXiv:1904. 01766v2, 13 pages.
Office Action in Australian Appln. No. 2024227407, mailed on Feb. 3, 2026, 3 pages.
Decision to Grant Patent in Japanese Appln. No. 2023-561364, mailed on Oct. 14, 2025, 5 pages (with English translation).
Office Action in Canadian Appln. No. 3,214,735, dated May 16, 2025, 4 pages.
Office Action in Chinese Appln. No. 202280025638.3, mailed on Sep. 1, 2025, 23 pages (with English translation).
Vinyals et al., "Show and Tell: A Neural Image Caption Generator," Proceedings of the IEEE conference on computer vision and pattern recognition, 2015, pp. 3156-3164.
Wei et al., "From Vision to Text: A Brief Survey for Image Captioning, Journal of Chinese Information Processing," Jul. 2020, 34(7):19-29 (English abstract).

* cited by examiner

300

302

Obtain input image

304

Process input image using image encoder neural network to generate image embeddings

306

Generate an input sequence of input embedding vectors

308

Process input sequence using language model neural network to generate output sequence

MULTIMODAL FEW-SHOT LEARNING WITH FROZEN LANGUAGE MODELS

CROSS-REFERENCE TO RELATED APPLICATIONS

This application is a National Stage Application under 35 U.S.C. § 371 and claims the benefit of International Application No. PCT/EP2022/065502, filed Jun. 8, 2022, which claims priority to Greek national patent application number GR 20210100374, filed on Jun. 8, 2021. The disclosure of the prior application is considered part of and is incorporated by reference in the disclosure of this application.

BACKGROUND

This specification relates to processing inputs that include images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, e.g., the next hidden layer or the output layer. Each layer of the network generates an output from a received input in accordance with current values of a respective set of parameters.

SUMMARY

This specification describes a system implemented as computer programs on one or more computers in one or more locations that performs a multi-modal task using an image encoder neural network and a language model neural network. The language model neural network is pre-trained, e.g., is not trained during the training of the image encoder neural network.

In one aspect, one of the methods includes obtaining an input image; processing the input image using an image encoder neural network that has been trained to process the input image to generate an image sequence of image embedding vectors characterizing the input image; generating an input sequence of input embedding vectors that includes the image sequence of image embedding vectors; and processing the input sequence of input embedding vectors that includes the image sequence of image embedding vectors using a trained language model neural network to generate as output an output sequence of text tokens that represents a text response to the input sequence of input embedding vectors, wherein: each text token in the output sequence is selected from a vocabulary of text tokens, the trained language model neural network has been trained to perform a language modeling task on training input sequences of text embedding vectors that represent text tokens from the vocabulary of text tokens, and each image embedding vector in the image sequence of image embedding vectors has a same dimensionality as the text embedding vectors that represent the text tokens from the vocabulary of text tokens.

Thus, the image encoder neural network is used to represent an image as a sequence of embeddings, such that a pre-trained language model prompted with an input (also referred to as a "prefix") that includes this sequence generates the appropriate output for a corresponding multi-modal task.

In some implementations, the image encoder neural network has been trained by backpropagating gradients of a loss function with respect to the parameters of the image encoder neural network through the trained language model neural network, and the loss function is a loss function for a multi-modal task that requires generating a training output text sequence comprising a plurality of text tokens by processing, using the trained language model neural network, a training input comprising a sequence of training image embedding vectors generated by the image encoder neural network from a training image. This allows the image encoder to learn to generate embeddings that can be effectively used to perform the task, even though the trained language model neural network has been trained to process embeddings representing text and the embeddings generated by the image encoder represent images.

In some of these implementations, the multi-modal task is an image captioning task, and wherein the training output text sequence is at least a portion of a text caption for the training image.

In some implementations, the trained language model neural network is not trained during the training of the image encoder neural network on the loss function for the multi-modal task, and the training of the image encoder neural network comprises backpropagating the gradients of the loss function through the trained language model neural network and into the image encoder neural network without adjusting parameters of the language model neural network. That is, the language model neural network is "frozen" during the training of the image encoder neural network and does not need to be fine-tuned to ensure high quality performance on any of a variety of multi-modal tasks after the image encoder neural network has been trained. The resulting combined model retains all of the capabilities of large language models, but can also process text and image inputs in any arbitrary sequence to perform a wide variety of multi-modal tasks.

In some implementations, the loss function measures respective likelihoods assigned to text tokens in a ground truth text output for the multi-modal task by score distributions over the text tokens in the vocabulary of text tokens generated by the trained language model neural network as a result of processing the training input.

In some implementations, the trained language model neural network has been trained on the language modeling task prior to the training of the image encoder neural network on the loss function for the multi-modal task.

In some implementations, the language model neural network is an auto-regressive neural network that auto-regressively generates the output sequence of text tokens by generating each particular text token in the output sequence conditioned on a current input sequence that includes (i) the input sequence of input embedding vectors followed by text embedding vectors of any text tokens that precede the particular text token in the output sequence.

In some implementations, the trained language model neural network is an auto-regressive Transformer-based neural network comprising a plurality of layers that each apply a self-attention operation. Thus, the described approach leverages the "knowledge" encoded in a large, pre-trained Transformer-based language model to generate a combined model that can perform a wide variety of multi-modal tasks, both in zero shot and few shot settings.

In some implementations, the trained language model neural network is configured to apply relative position encodings to the input sequence prior to processing the input sequence using the plurality of layers.

In some implementations, the image encoder neural network comprises a convolutional neural network.

In some implementations, the convolutional neural network is configured to process the input image to generate an output tensor characterizing the input image, and wherein the image encoder neural network is configured to map the output tensor to the image sequence of image embedding vectors.

In some implementations, the output sequence of text tokens represents at least a portion of predicted text caption for the input image.

In some implementations, the input sequence of input embedding vectors also comprises (i) one or more sequences of text embedding vectors that each represent a respective text sequence, (ii) one or more other sequences of image embedding vectors that each characterize another input image, or (iii) both.

In some implementations, the input sequence of input embedding vectors comprises the image sequence of image embedding vectors and a sequence of text embedding vectors that represents a question about the input image, and wherein the output sequence of text tokens represents a predicted text answer to the question about the input image.

In some implementations, the input sequence of input embedding vectors comprises (i) one or more other sequences of image embedding vectors and (ii) for each other sequence of image embedding vectors, a respective sequence of text embedding vectors that represents a classification for the other image characterized by the other sequence of image embedding vectors, and wherein the output sequence of text tokens represents a predicted classification for the input image.

In some implementations, the input sequence of input embedding vectors comprises (i) one or more other sequences of image embedding vectors each characterizing a respective additional input image, and (ii) for each other sequence of image embedding vectors, a respective sequence of text embedding vectors that represents an answer to a question when asked about the additional image characterized by the other sequence of image embedding vectors, and wherein the output sequence of text tokens represents a predicted answer to the question when asked about the input image.

In some implementations, the input sequence of input embedding vectors comprises (i) one or more other sequences of image embedding vectors each characterizing a respective additional input image, (ii) for each other sequence of image embedding vectors, a respective sequence of text embedding vectors that provides a particular type of information about the additional image characterized by the other sequence of image embedding vectors, and (iii) for the image sequence of image embedding vectors, a partial sequence of text embeddings that represents a text prompt to provide the particular type of information about the input image, and wherein the output sequence of text tokens represents a predicted completion of the text prompt that provides the particular type of information about the input image.

In some implementations, the input sequence of input embedding vectors comprises a first sequence of text embedding vectors that represent a text sequence that describes a task that should be performed by the text response represented by the output sequence.

The subject matter described in this specification can be implemented in particular embodiments so as to realize one or more of the following advantages.

When trained at sufficient scale, language models, e.g., Transformer-based language models that generate outputs auto-regressively using self-attention, exhibit the notable ability to learn a new language task after being prompted with just a few examples. The described techniques transfer this few-shot learning ability to a multimodal setting by using a vision encoder to represent an image as a sequence of continuous embeddings, such that a pre-trained, frozen language model prompted with a "prefix" that includes this sequence generates the appropriate output for a corresponding multi-modal task. The resulting system is a multimodal few-shot learner, with the surprising ability to learn a variety of new tasks when conditioned on examples, represented as a sequence of any number of interleaved image and text embeddings. As a particular example, the resulting system can rapidly "learn" words for new objects and novel visual categories, do visual question answering with only a handful of examples, and make use of outside knowledge without any additional training or fine-tuning after the image encoder has been trained. Thus, the resulting system can effectively perform a multimodal task (i) even though the language model was only trained on a language modeling task that operates only on text data and (ii) even if the image encoder neural network was trained while performing an entirely different multimodal task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that performs one or more multi-modal tasks.

Figure 1:
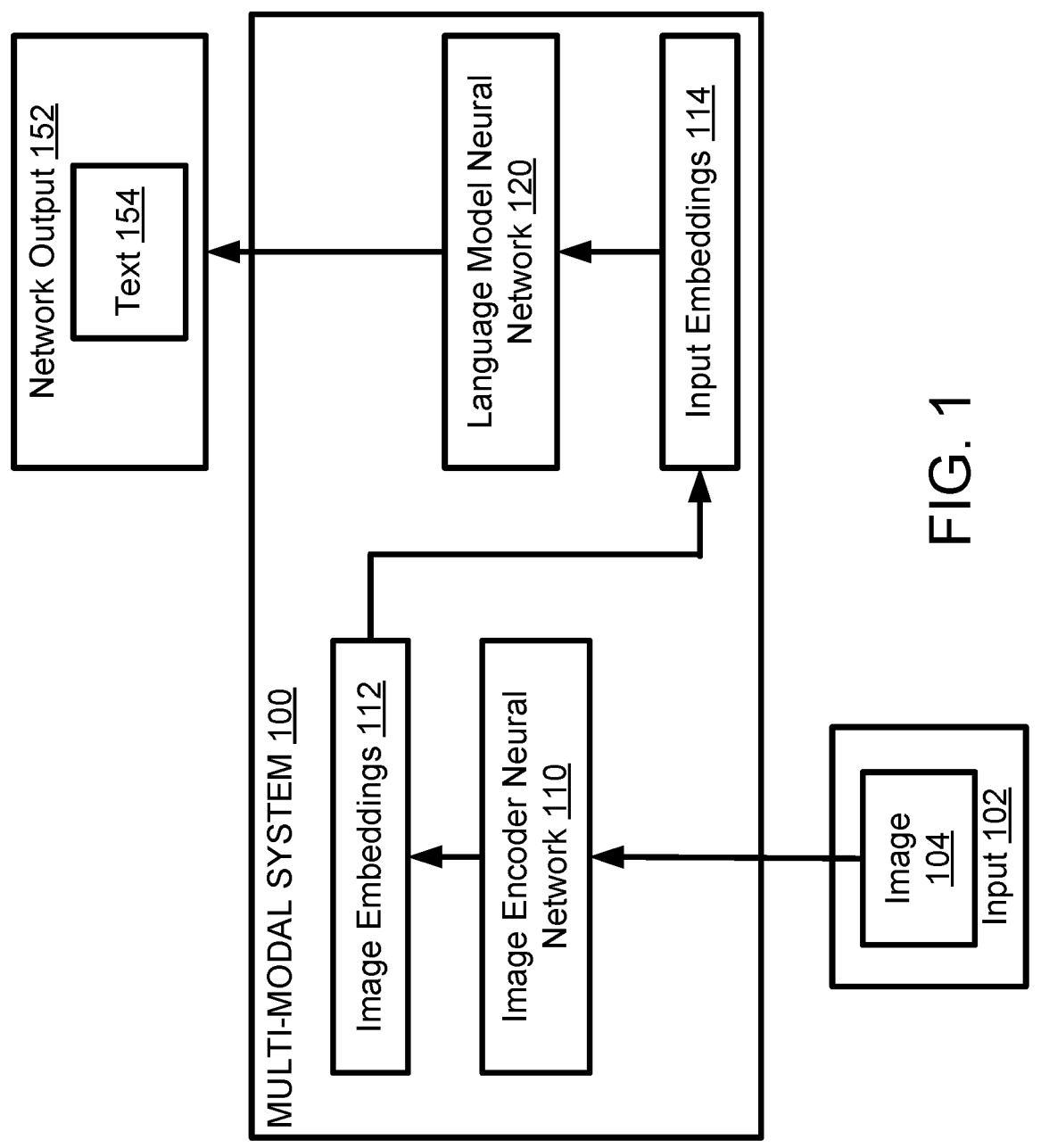
FIG. 1 is a diagram of an example multi-modal system.

FIG. 1 is a diagram of an example multi-modal system 100. The multi-modal system 100 is an example of a system implemented as computer programs on one or more computers in one or more locations, in which the systems, components, and techniques described below can be implemented.

The multi-modal system 100 is configured to perform one or more multi-modal tasks using an image encoder neural network 110 and a language model neural network 120.

A multi-modal task, as used in this specification, is one that requires processing a network input 102 that includes an image 104 (e.g. an image of the real world captured by a camera) to generate a network output 152 that includes a sequence of text tokens 154. In some cases, the network input 102 can also include text, one or more other images, or both.

Examples of multi-modal tasks are described in more detail below.

The image encoder neural network 110 is a neural network that is configured to receive an image and to process the image, e.g., to process the intensity values of the pixels of the image, to generate an image sequence of image embedding vectors characterizing the image.

An "embedding vector," as used in this specification is a vector of numeric values, e.g., floating point or other type of numeric values, that has a predetermined dimensionality, e.g., has a predetermined number of values.

The image encoder neural network 110 can generally have any appropriate architecture that maps the image to a sequence of embeddings. The sequence of embeddings can have a predetermined number, e.g., 1, 2, 4 or 8, of embeddings.

For example, the image encoder neural network 110 can include a convolutional neural network.

As a particular example, the convolutional neural network can be configured to process the image to generate an output tensor characterizing the input image and the image encoder neural network 110 can be configured to map the output tensor to the image sequence of image embedding vectors. That is, the neural network 110 can include (i) the convolutional neural network and (ii) an additional component that maps the output tensor to the image sequence. For example, the additional component can apply a linear transformation to linearly map the output tensor to D*n channels, and then reshape the result as a sequence of n embeddings, each with dimensionality D.

As another example, the image encoder neural network 110 can be a Vision Transformer neural network. A Vision Transformer is a neural network that obtains a plurality of image patches of an image, generates a respective embedding of each image patch, and then updates the respective embeddings using one or more self-attention layer blocks (e.g. arranged in a sequence, such that the output of each self-attention layer block other than the last self-attention layer block is the input of a succeeding self-attention layer block of the sequence). In this example, the sequence of embeddings can be the updated embeddings for some or all of the patches generated by the last self-attention layer block.

The language model neural network 120 is a neural network that is configured to receive as input a sequence of input embedding vectors and to process the input to generate as output an output sequence of text tokens.

Each input embedding vector has the same dimensionality as the image embedding vectors that are generated by the image encoder neural network 110.

As will be discussed in more detail below, during the training of the language model neural network 120, the input embedding vectors represent text tokens while, after training and while performing the multi-modal task, at least some of the input embedding vectors are image embedding vectors.

More specifically, the system 100 can also include a text embedder, which is an embedding function that independently transforms each token in a vocabulary of tokens to a respective text embedding that has the same dimensionality as the input embeddings. The text embeddings can be fixed, e.g., pre-determined, or can be learned during the training of the language model neural network 120.

The tokens in the vocabulary can be any appropriate text tokens, e.g., words, word pieces, punctuation marks, and so on that represent elements of text in one or more natural languages and, optionally, numbers and other text symbols that are found in a corpus of text. For example, the system can tokenize a given sequence of words by applying a tokenizer, e.g., the SentencePiece tokenizer or another tokenizer, to divide the sequence into tokens from the vocabulary.

The language model neural network 120 can be an auto-regressive neural network that auto-regressively generates the output sequence of text tokens by generating each particular text token in the output sequence conditioned on a current input sequence that includes (i) the input sequence of input embedding vectors followed by (ii) text embedding vectors of any text tokens that precede the particular text token in the output sequence (as generated by the text embedder).

More specifically, to generate a particular text token, the neural network 120 can process the current input sequence to generate a score distribution, e.g., a probability distribution, that assigns a respective score, e.g., a respective probability, to each token in the vocabulary of text tokens. The neural network 120 can then select, as the particular text token, a text token from the vocabulary using the score distribution. For example, the neural network 120 can greedily select the highest-scoring token or can sample, e.g., using nucleus sampling or another sampling technique, a token from the distribution.

As a particular example, the trained language model neural network 120 can be an auto-regressive Transformer-based neural network that includes a plurality of layers that each apply a self-attention operation. The neural network 120 can have any of a variety of Transformer-based neural network architectures. Examples of such architectures include those described in Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv: 1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv:2005.14165, 2020.

Optionally, the language model neural network 120 can apply relative position encodings to the input sequence (or the current input sequence). That is, the language model neural network 120 can use relative positional encoding, which enables the language model neural network 120 to generalize to prompt sequences where an image is not always in the first absolute positions, and where more than one image may be present. As one example, the language model neural network 120 can use relative positional encoding as described in Peter Shaw, Jakob Uszkoreit, and Ashish Vaswani. Self-attention with relative position representations.

Prior to using the image encoder neural network 110 and the language model neural network 120 to perform the one or more multi-modal tasks, the neural networks 110 and 120 are trained, e.g., by the system 100, by one or more other systems, or partially by the system 100 and partially by one or more other systems.

In particular, the system 100 or one of the other systems pre-trains the language model neural network 120 on a language modeling task, e.g., a task that requires predicting, given a current sequence of text tokens, the next token that follows the current sequence in the training data. As a particular example, the language model neural network 120 can be pre-trained on a maximum-likelihood objective on a large dataset of text, e.g., text that is publically available from the Internet or another text corpus.

Thus, during this pre-training, the input sequences to the neural network 120 include only text embeddings of text tokens from the vocabulary.

Because the text used for the pre-training does not need to be labeled and because large quantities of unlabeled text are readily available, e.g., from the Internet or in other large-scale text corpuses, the language model neural network 120 can be pre-trained on a large set of training data and the trained language model neural network 120 can therefore encode a large amount of text-based knowledge.

After training the language model neural network 120, the system 100 or another trains the image encoder neural network 110 on training data for a multi-modal task while keeping the language model neural network 120 "frozen." That is, during this training, the parameters of the image encoder neural network 110 are adjusted while the parameters of the language model neural network 120 are kept fixed.

This training of the image encoder neural network 110 will be described in more detail below with reference to FIG. 2.

After training, to perform a multi-modal task, the system 100 obtains the input 102 that includes the input image 104 and processes the input image 104 using the image encoder neural network 110.

As described above, the image encoder neural network 110 has been trained to process the input image 104 to generate an image sequence of image embedding vectors 112 characterizing the input image 104.

If the input 102 also includes one or more other input images, the system 100 also processes each other input image using the image encoder neural network 110 to generate a respective sequence of image embedding vectors for each other input image.

The system 100 then generates an input sequence of input embedding vectors 114 that includes the image sequence of image embedding vectors 112.

In particular, depending on the multi-modal task that the system 100 is performing, the input sequence could include only the image sequence of image embedding vectors 112 or can include (i) one or more sequences of text embedding vectors that each represent a respective text sequence, (ii) one or more other sequences of image embedding vectors that each characterize another input image, or (iii) both. That is, each input embedding vector 114 has the same dimensionality as the image embedding vectors 112 but, for some tasks, the embedding vectors 114 also include other text or image embeddings in addition to the image embedding vectors 112.

That is, even when the image encoder neural network 110 is only trained for a single multi-modal task, the system 100 can perform multiple different multi-modal tasks after training by appropriately generating the input sequence.

The system 100 processes the input sequence of input embedding vectors 114 that includes the image sequence of image embedding vectors 112 using the trained language model neural network 120 to generate, as at least a portion of the network output 152, an output sequence of text tokens 154 that represents a text response to the input sequence of input embedding vectors 114.

In particular, as described above, each text token 154 in the output sequence is selected from a vocabulary of text tokens and the trained language model neural network 120 has been trained to perform a language modeling task on training input sequences of text embedding vectors that represent text tokens from the vocabulary of text tokens. So that the system 100 can effectively condition the language model 120 on a representation of the input image 104, each image embedding vector 112 in the image sequence of image embedding vectors 112 has the same dimensionality as the text embedding vectors that represent the text tokens from the vocabulary of text tokens.

Thus, even though the language model neural network 110 was only trained on text input sequences, at inference the system 100 uses the language model neural network 110 to effectively perform multi-modal tasks.

Figure 2:
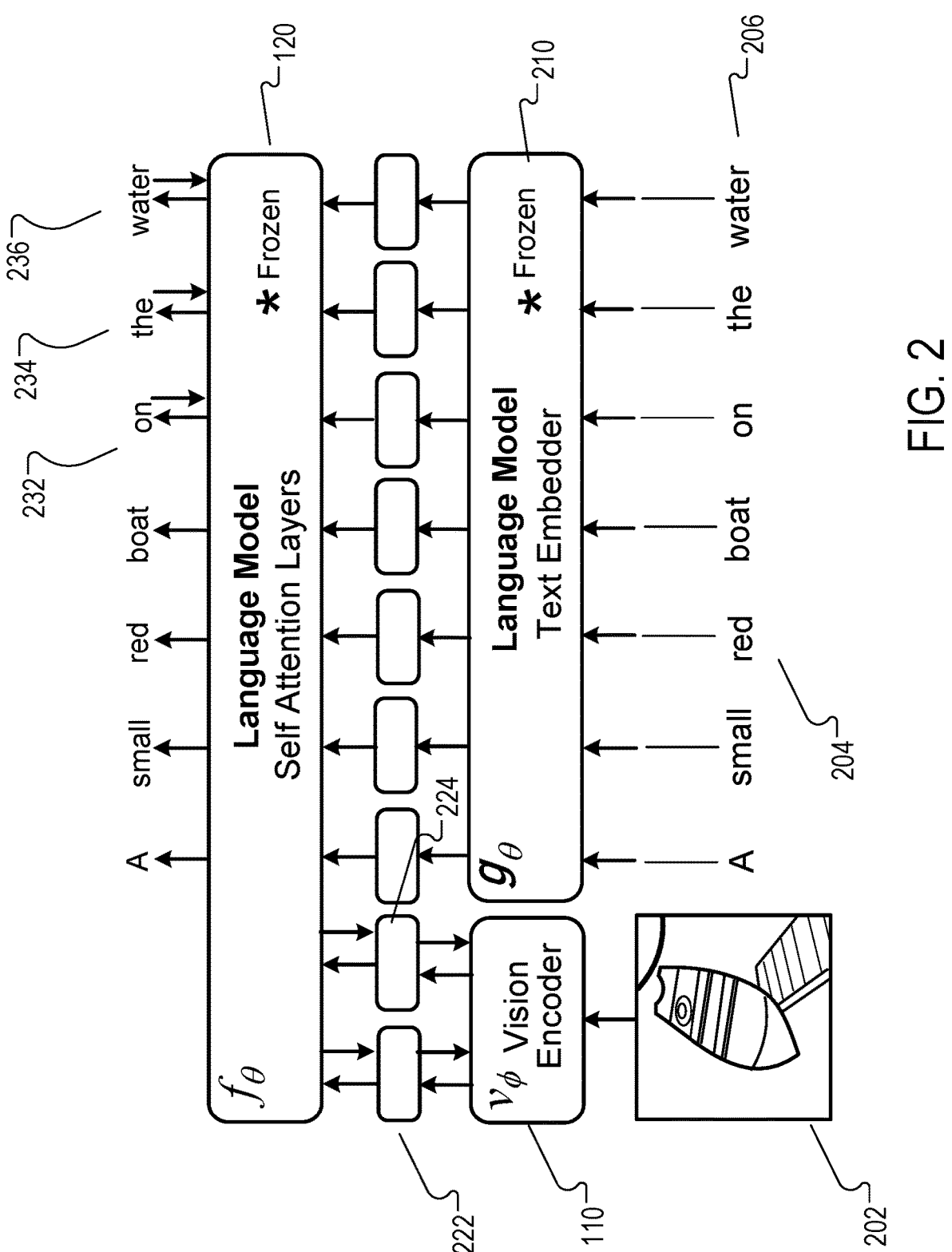
FIG. 2 shows the training of the image encoder neural network.

FIG. 2 shows the training of the image encoder neural network 110.

As described above, after the language model neural network 120 is pre-trained on the language modeling task, the image encoder neural network 110 is trained on a multi-modal task.

The training data for the multi-modal task includes multiple training examples, where each training example includes (i) a training input for the task that includes one or more images and (ii) ground truth text for the training input, e.g., the text that should be generated by performing the multi-modal task on the training input.

For example, the multi-modal task can be an image captioning task that requires generating a text caption for an input image, each training input can include a single image, and the ground truth text for the training input can be (at least a portion of) a ground truth text caption for the single image.

In particular, the multi-modal task requires generating a training output text sequence that includes a plurality of text tokens by processing, using the trained language model neural network 120, a training input 204 that includes a sequence of training image embedding vectors 206 generated by the image encoder neural network 110 from a training image 202. When the multi-modal task is the image captioning task, the training output sequence is (at least a portion of) a text caption for the training image 202.

To train the image encoder neural network 110 on the multi-modal task, the system backpropagates gradients of a loss function for the multi-modal task with respect to the parameters of the image encoder neural network 110 through the trained language model neural network 120. The parameters of the image encoder neural network 110 include the weights and, in some cases, biases of the layers of the image encoder neural network 110, e.g., the kernels of any convolutional layers in the network 110, the weight matrices of any fully-connected layers in the network 110, and so on.

In particular, the system can, at each of multiple training iterations, sample training examples for the training data, and compute gradients of the loss function for the multi-modal task with respect to the parameters of the image encoder neural network 110 using the sampled training examples, e.g., by backpropagating through the trained language model neural network 120. The system can then update the parameters of the image encoder neural network 110 by applying an optimizer to the computed gradients to generate an update and then adding the update to or subtracting the update from the current values of the parameters.

As a particular example, the loss function for the multi-modal task can measure the respective likelihoods assigned to text tokens in a ground truth text output for the multimodal task by score distributions over the text tokens in the vocabulary of text tokens generated by the trained language model neural network 120 as a result of processing the training input.

For example, when the language model neural network 120 is an auto-regressive neural network as described above, the loss function can be a negative log likelihood loss that measures, for each particular token in the ground truth text output for a given training input, the negative log of the probability assigned to the particular token by the score distribution generated by the neural network 120 by processing an input sequence that includes embeddings of (i) the given training input and (ii) any tokens that precede the particular token in the ground truth text output.

FIG. 2 shows an example of the training of the image encoder neural network ("vision encoder") 110 on a training input for the image captioning task that includes (i) a training image 202 and (ii) an initial portion 204 of a caption for the training image 202.

As shown in FIG. 2, the system makes use of (i) a text embedder 210 that receives text tokens and generates a respective embedding of each of the text tokens and (ii) the language model neural network 120 which, in the example of FIG. 2, is a Transformer-based neural network, e.g. a neural network that includes a set of one or more self-attention layers that apply (causally masked) self-attention as described above, and in more detail below. In the example of FIG. 2, the training image 202 is an image of a red boat, the initial portion 204 of the caption is "A small red boat" and the task requires the neural network 120 to generate an output that completes the caption, e.g., to generate the completion 206 "on the water."

As shown in FIG. 2, the system processes the training image 202 using the image encoder 110 to generate a sequence of image embeddings that includes two image embeddings 222.

The system then processes a training input sequence that includes the embeddings 222 and 224 followed by the text embeddings of the initial portion 204 to evaluate a loss function that is a combination of, e.g., a sum of, a respective loss for each of the tokens in the completion 206, e.g., a respective loss for the token "on" 232, the token "the" 234, and the token "water" 236.

The loss for a given token can be e.g., the negative log of the probability assigned to the given token by the score distribution generated by the neural network 120 by processing an input sequence that includes embeddings of (i) the given training input and (ii) any tokens that precede the given token in the ground truth text output.

The system then backpropagates the losses through the language model neural network 120 while holding the language model neural network 120 (and the text embedder 210) frozen to compute a respective gradient with respect to each of the image embeddings 222 and 224. The system can then backpropagate the gradients through the image encoder neural network 110 to determine the gradients with respect to the parameters of the neural network 110.

Thus, as shown in FIG. 2, the trained language model neural network 120 is not trained during the training of the image encoder neural network 110 on the loss function for the multi-modal task (and neither is the text embedder 210) and the system backpropagates the gradients of the loss function through the trained language model neural network 120 and into the image encoder neural network 110 without adjusting parameters of the language model neural network 120.

While the example of FIG. 2 shows the processing for a single training example, in practice, the system can process multiple training examples in parallel at a given training step, and the overall gradient that is computed for the training step can be the sum of the respective gradients for each of the training examples.

While the tokens are illustrated in FIG. 2 as words, as described above, the tokens can be any appropriate text tokens, e.g., words, word pieces, punctuation marks, and so on. For example, the system can tokenize a given sequence of words by applying a tokenizer, e.g., the SentencePiece tokenizer or another tokenizer, to divide the sequence into tokens from the vocabulary.

Figure 3:
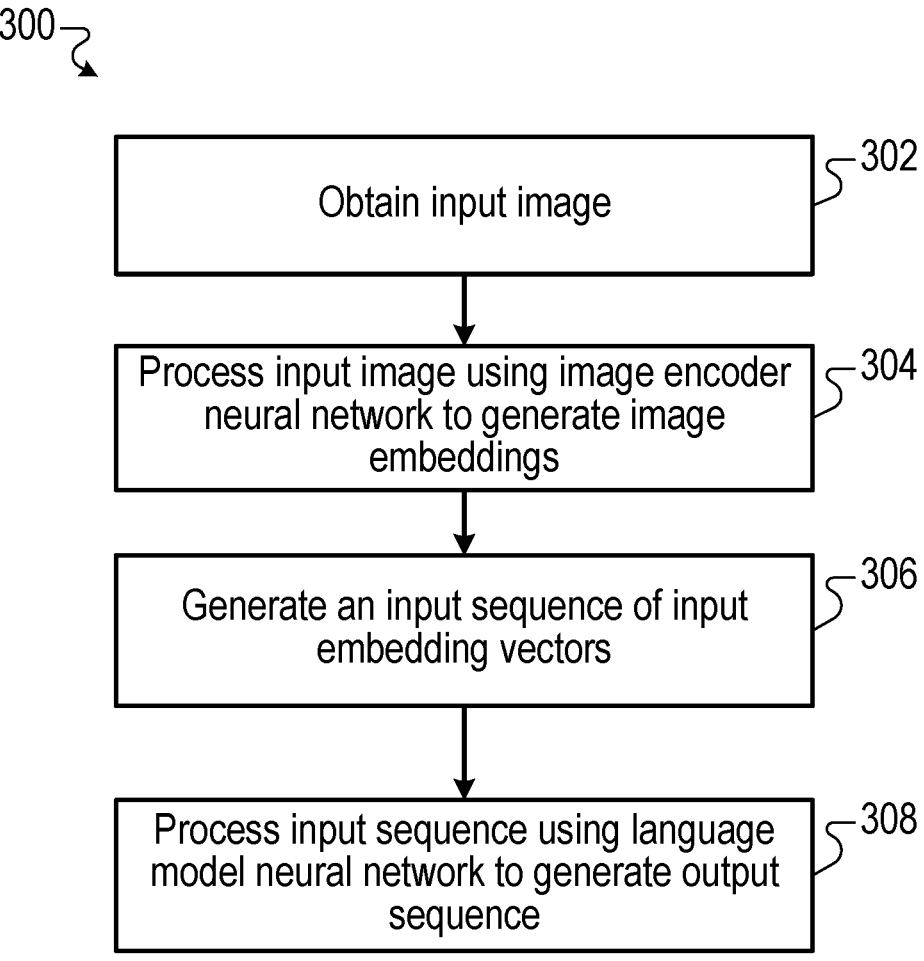
FIG. 3 is a flow diagram of an example process for performing a multi-modal task.

FIG. 3 is a flow diagram of an example process 300 for performing a multi-modal task. For convenience, the process 300 will be described as being performed by a system of one or more computers located in one or more locations. For example, a multi-modal system, e.g., the multi-modal system 100 depicted in FIG. 1, appropriately programmed in accordance with this specification, can perform the process 300.

The system obtains an input image (step 302).

The system processes the input image using an image encoder neural network that has been trained to process the input image to generate an image sequence of image embedding vectors characterizing the input image (step 304).

The system generates an input sequence of input embedding vectors that includes the image sequence of image embedding vectors (step 306).

The manner in which the system generates the input sequence is dependent on the multi-modal task that the system is performing.

Generally, for at least some tasks, in addition to the image sequence of image embedding vectors, the input sequence can also include one or more "prompt" sequences of text embedding vectors. A prompt sequence of text embedding vectors represents a text sequence that describes the task that should be performed by the text response by the output sequence, e.g., provides the language model neural network with information about what task should be performed using the image embedding vectors.

For example, for an image captioning task or other multi-modal task that operates on a single image, the input sequence can include (i) only the image sequence of image embedding vectors or (ii) the image sequence of image embedding vectors followed by or preceded by a "prompt" sequence of text embedding vectors that represent a text sequence that describes the task that should be performed by the text response represented by the output sequence. In the example of an image captioning task, the prompt sequence can represent, e.g., "Caption this" or "Caption:"

As another example, for an image caption completion task, a visual question answering task or other multi-modal task that operates on a single image and text related to the image, the input sequence can include (i) only the image sequence of image embedding vectors and text embeddings of the text sequence related to the image or (ii) the image sequence of image embedding vectors and the text embeddings of the text sequence related to the image followed by, preceded by, or both by one or more "prompt" sequences of text embedding vectors that represent a text sequence that describes the task that should be performed by the text response represented by the output sequence. In the example of the visual question answering task, the text embeddings can be preceded by a first prompt sequence that represents "Q:" or "Question" and can be followed by a second prompt sequence that represents, e.g., "A:" or "Answer:"

Examples of other multi-modal tasks and input sequences for those tasks are described below with reference to FIGS. 4-6.

The system processes the input sequence of input embedding vectors using the trained language model neural network to generate as output an output sequence of text tokens that represents a text response to the input sequence of input embedding vectors (step 308).

Figure 4:
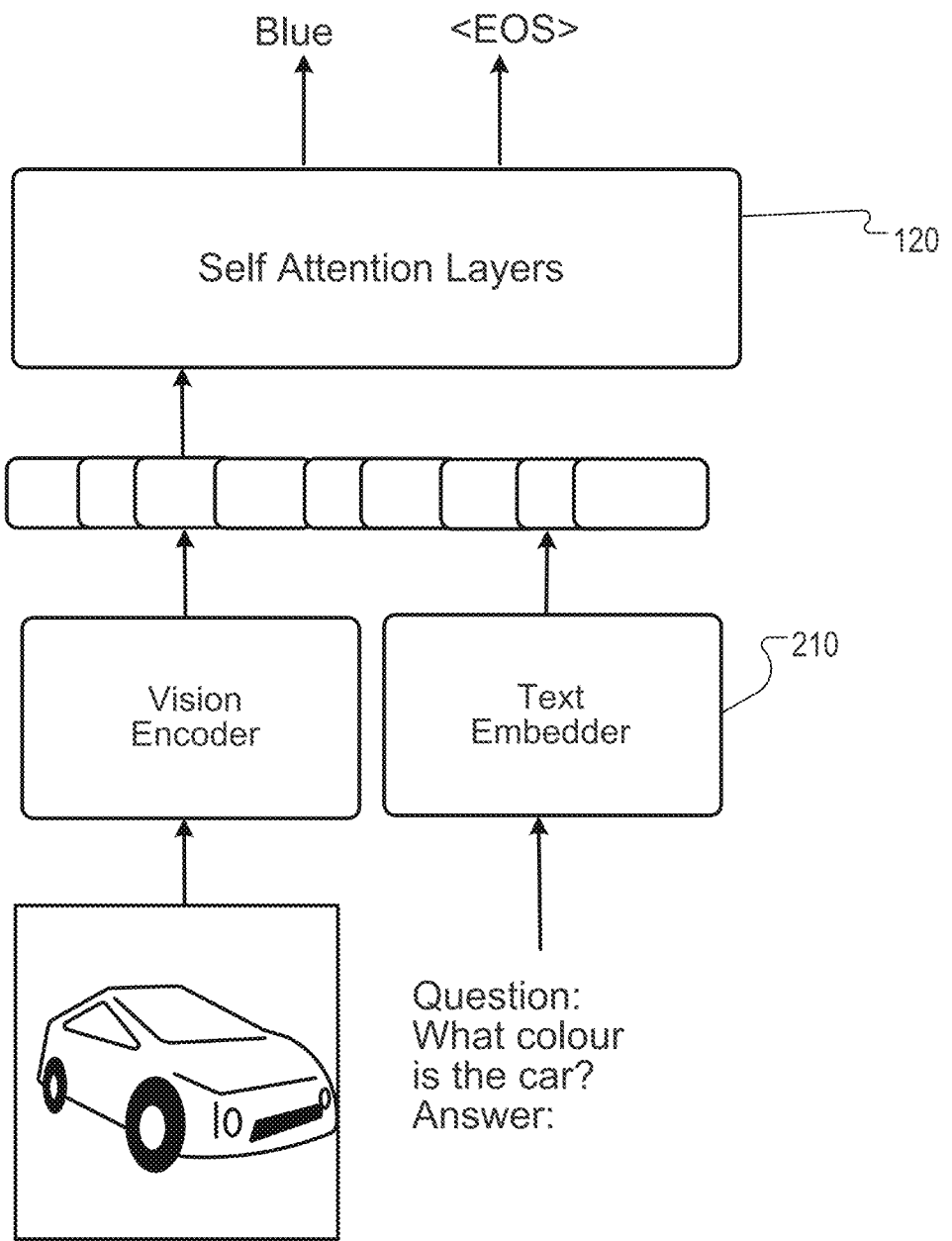
FIG. 4 shows an example of the image encoder neural network and a language model neural network being used to perform a visual question answering task.

FIG. 4 shows an example of the image encoder neural network 110 and the language model neural network 120 being used to perform a visual question answering task.

In the visual question answering task, the input sequence of input embedding vectors includes the image sequence of image embedding vectors for the input image and a sequence of text embedding vectors that represents a question about the input image, and the output sequence of text tokens represents a predicted text answer to the question about the input image.

In the example of FIG. 4, the system receives an image of a car and a question about the image ("what colour is the car?"). The system then generates an input sequence that includes an image sequence of image embedding vectors of the received image and a sequence of text embedding vectors that represents a question about the input image. In the example of FIG. 4, the input sequence also includes two prompt sequences that give the neural network 120 information about what task is being performed, e.g., so that the overall sequence of text embedding vectors includes embeddings of the text "Question: What colour is the car? Answer: ".

The system then processes the input sequence to generate an output sequence of text tokens that represents a predicted text answer to the question about the input image ("Blue"). In the example of FIG. 4, the output sequence also includes a designated end-of-sequence ("EOS") token that can be removed before the output is provided to a user.

Figure 5:
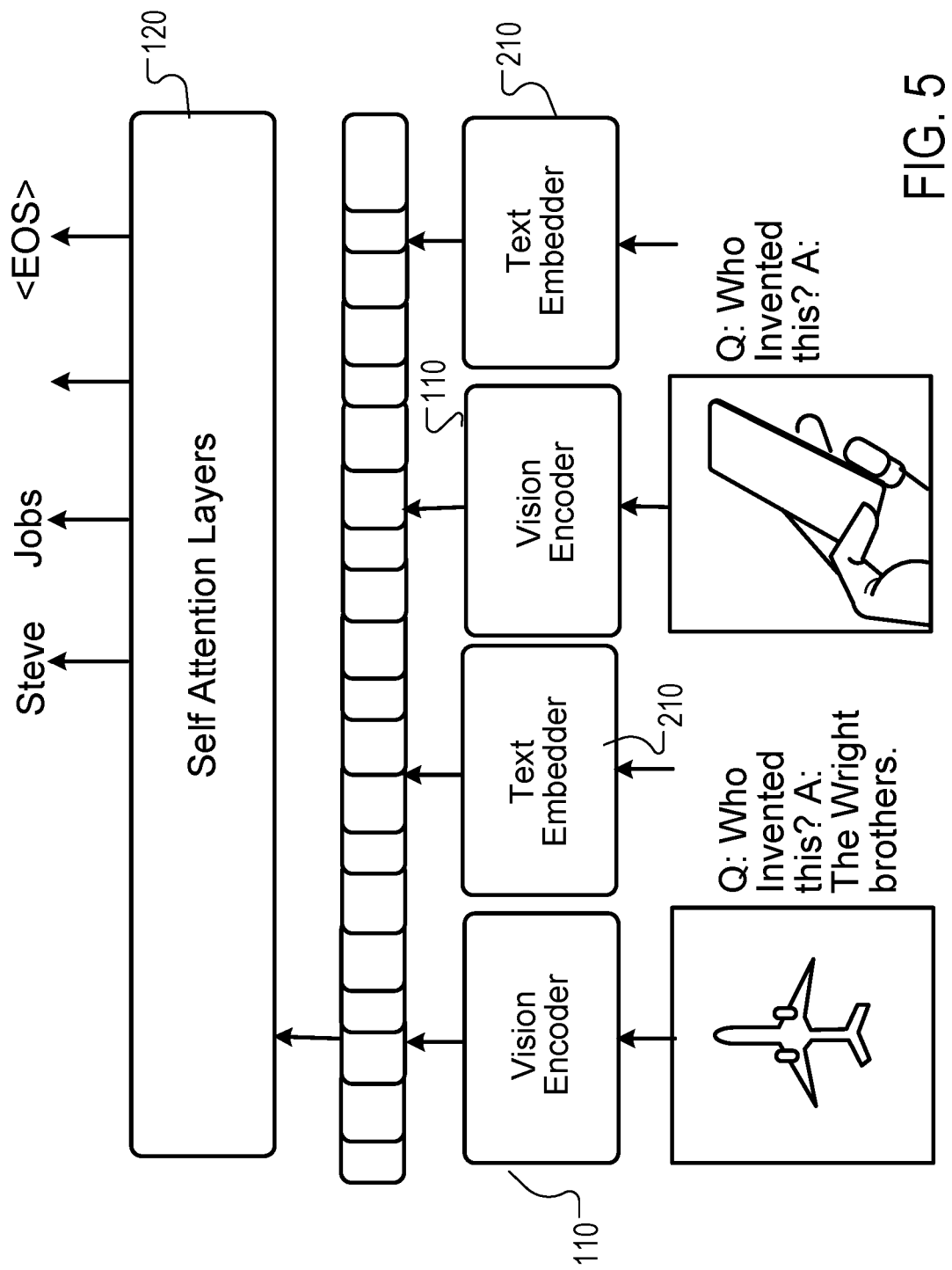
FIG. 5 shows an example of the image encoder neural network and the language model neural network being used to perform a k-shot outside-knowledge visual question answering task.

FIG. 5 shows an example of the image encoder neural network 110 and the language model neural network 120 being used to perform a k-shot outside-knowledge visual question answering task. In the example of FIG. 5, k is equal to one, but, more generally, k can be equal to any positive integer, e.g., any integer greater than or equal to one.

In this task, the input sequence of input embedding vectors includes, in addition to the embedding of the input image, (i) k other sequences of image embedding vectors each characterizing a respective additional input image, and (ii) for each other sequence of image embedding vectors, a respective sequence of text embedding vectors that represents an answer to a question when asked about the additional image characterized by the other sequence of image embedding vectors.

In the example of FIG. 5, the input sequence includes embeddings of an image of an airplane, and embeddings of a text sequence representing a question and an answer about the image, e.g., "Q: Who invented this? A: The Wright brothers." The input sequence also includes the input image, e.g., an image of a mobile phone, and a text sequence representing a question about the input image "Q: Who invented this? A:".

The system processes the input sequence to generate an output sequence of text tokens represents a predicted answer to the question when asked about the input image. In the example of FIG. 5, the answer is "Steve Jobs."

In the example of FIG. 5, the output sequence also includes a designated end-of-sequence ("EOS") token that can be removed before the output is provided to a user.

Alternatively, instead of posing the task as a question and an answer, the system can pose the context text sequence as a statement, e.g., "This was invented by the Wright brothers," and the text sequence representing the question can be posed as an incomplete statement, e.g., "This was invented by" that needs to be completed by the output of the neural network.

The task in FIG. 5 is referred to as an "outside knowledge" task because the answer to the question is not depicted in the image and the task therefore requires the language model neural network 120 to use information encoded as a result of the pre-training to determine the correct answer.

Figure 6:
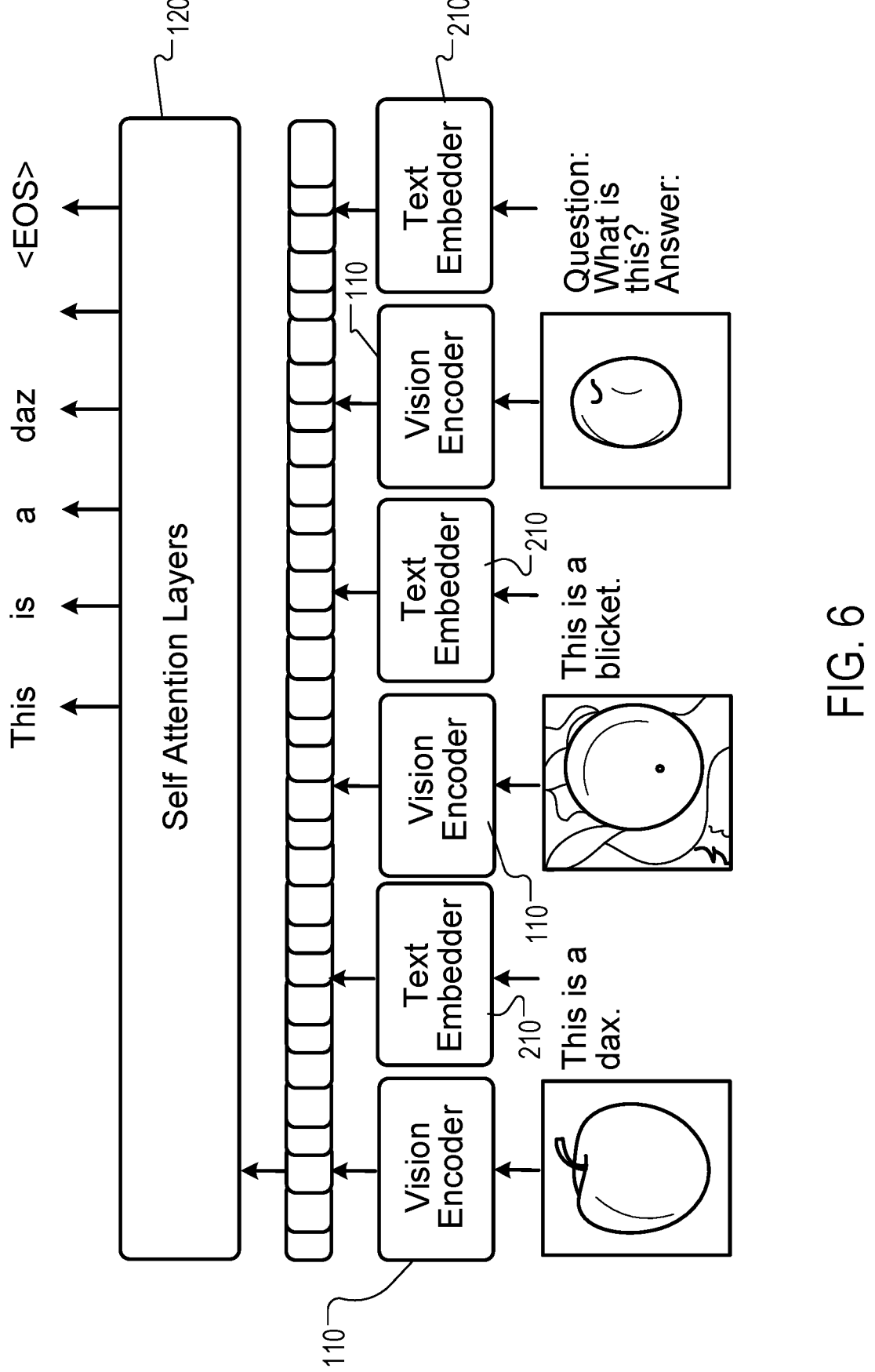
FIG. 6 shows an example of the image encoder neural network and the language model neural network being used to perform a k-shot image classification task.

FIG. 6 shows an example of the image encoder neural network 110 and the language model neural network 120 being used to perform a k-shot image classification task. In the example of FIG. 6, k is equal to two, but, more generally, k can be equal to any positive integer, e.g., any integer greater than or equal to one.

In this task, the input sequence of input embedding vectors includes, in addition to the embedding of the input image, (i) k other sequences of image embedding vectors each characterizing a respective additional input image, and (ii) for each other sequence of image embedding vectors, a respective sequence of text embedding vectors that represents a text classification (a "text label") for the other image.

In the example of FIG. 6, the input sequence includes embeddings of a first image of a first fruit and a label for that first image ("This is a dax.") and embeddings of a second image of a second fruit and a label for that second image ("This is a blicket.") The input sequence also includes the input image, e.g., an image of a third fruit, and a prompt text sequence for the classification task: "Question: What is this? Answer:"

The system processes the input sequence to generate an output sequence of text tokens represents a predicted classification for the input image. In the example of FIG. 5, the answer is "This is a dax."

In the example of FIG. 6, the output sequence also includes a designated end-of-sequence ("EOS") token that can be removed before the output is provided to a user.

More generally, the classification task in the example of FIG. 6 can be framed as a task that provides a particular type of information about one or more additional images and requires the neural network to provide the same type of information about the input image.

That is, for these types of tasks, the input sequence of input embedding vectors includes (i) one or more other sequences of image embedding vectors each characterizing a respective additional input image, (ii) for each other sequence of image embedding vectors, a respective sequence of text embedding vectors that provides a particular type of information about the additional image characterized by the other sequence of image embedding vectors, and (iii) for the image sequence of image embedding vectors, a partial sequence of text embeddings that represents a text prompt to provide the particular type of information about the input image. The output sequence, then, represents a predicted completion of the text prompt that provides the particular type of information about the input image.

While FIGS. 4-6 show examples of multi-modal tasks, these are merely examples of a variety of types of few-shot or zero-shot multi-modal tasks that the system can perform without needing to re-train the image encoder or the language model neural network on training data for these types of tasks.

The multi-model system 100 of FIG. 1 has a number of technical applications. For example, the image 104 of an input 102 may be an image of the real world captured by a camera, and the text data 154 may be text describing the real world. In particular, the text 154 may answer a question about the real world posed by text included in the input 102. Thus, one technical application of the multi-model system 100 is to be used by a visually-impaired user to obtain information about the image 104. For example, the multi-model system 100 may be part of a computer system which obtains the image 104 (e.g. using a camera of the computer system). The user can supply the text of the input 102 (e.g. by controlling a data input device, or by speaking a command which is converted into text by the computer system, e.g. a string of letters or tokens representing phonemes). The multi-model system 100 can then generate the output text 154, e.g. as a string of tokens which are converted into a sound signal which is broadcast to the user by a speaker device. A useful feature of this computer system is its flexibility, since the user may freely define the information which the query processing system should extract from the image 104.

Optionally, the computer system may be configured to allow the user to generate a series of multiple inputs 102, each including the same image 104 but with different respective text. For example, the text of a first input 102 may be "What is shown in the picture?". If the query processing system generates, in response to the first input 102, a corresponding output text 154 (e.g. "A bus"), then the person may be able to define a second input 102 including the same image 104 and with new text (e.g. "What destination is on the front of the bus?").

Optionally, each input 102 in the series of inputs 102, except the first input 102 of the series, may include the input text and the output text 154 from one or more of the previous inputs 102 in the series. In this way, the person may engage in a coherent discussion with the multi-model system 100 about the image 104 (which is typically included in all the inputs 102 of the series), in which at each stage the multi-model system 100 generates an output text 154 which is a sensible continuation of the earlier part of the discussion.

Another technical application of the multi-model system 100 is a captioning system for an image 104. The text of the input 102 may define an image processing task such as "provide a caption explaining what is happening", and in this case the output text 154 may comprise a caption describing events or actions depicted in the image 104.

In another technical application, the image 104 comprises text, and the computer system might comprise an OCR (optical character recognition) system for extracting the text from the image 104 to generate at least part of some text in the input 102. For example, if the image 104 is an image of a scene comprising a sign with instructions (e.g. the image may be an image of a road including a road sign including text), the OCR may generate the text of the input 102 based on the instructions in the image. In this case, the output text 154 may indicate the significance of the instructions, given the rest of the scene (e.g. in the case of an image 104 which is an image of an empty parking bay and a sign indicating that parking is allowable at the present time, the output text 154 may be "Please park here").

In another technical application, the input 102 may instruct the multi-model system 100 to generate, as the output text 154, code executable by a processor of a computer system. For example, the input 102 may include text which reads "Generate HTML code which when executed generates a video image of the object shown in the image".

A self-attention layer, as referred to above, is a neural network layer that includes an attention mechanism that operates over the self-attention layer input (or an input derived from the layer input) to generate the self-attention layer output. A self-attention mechanism may be causally masked so that any given position in an input sequence does not attend over (e.g. use data from) any positions after the given position in the input sequence. There are many different possible attention mechanisms. Some examples of self-attention layers including attention mechanisms, are described in Vaswani et al. "Attention is all you need", 31st Conference on Neural Information Processing Systems (NIPS 2017), Long Beach, CA, USA; Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv: 1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv:2005.14165, 2020.

Generally, an attention mechanism maps a query and a set of key-value pairs to an output, where the query, keys, and values are all vectors. The output is computed as a weighted sum of the values, where the weight assigned to each value is computed by a compatibility function, e.g. a dot product or scaled dot product, of the query with the corresponding key.

Generally, a self-attention mechanism is configured to relate different positions in the same sequence to determine a transformed version of the sequence as an output. For example the attention layer input may comprise a vector for each element of the input sequence. These vectors provide an input to the self-attention mechanism and are used by the self-attention mechanism to determine a new representation of the same sequence for the attention layer output, which similarly comprises a vector for each element of the input sequence. An output of the self-attention mechanism may be used as the attention layer output, or it may be processed by one or more of feed-forward layers, skip connections, or normalization operations to provide the attention layer output.

In some implementations the attention mechanism is configured to apply each of a query transformation e.g. defined by a matrix $W^Q$, a key transformation e.g. defined by a matrix $W^K$, and a value transformation e.g. defined by a matrix $W^V$, to the attention layer input which is the input data X to the attention layer, to derive a query matrix $Q=XW^Q$ that includes a respective query for each vector in the input sequence, key matrix $K=XW^K$ that includes a respective key for each vector in the input sequence, and value matrix $V=XW^V$ that includes a respective value for each vector in the input sequence, which are used determine an attended sequence for the output. For example the attention mechanism may be a dot product attention mechanism applied by applying each query vector to each key vector to determine respective weights for each value vector, then combining the value vectors using the respective weights to determine the self-attention layer output for each element of the input sequence. The self-attention layer output may be scaled by a scaling factor e.g. by the square root of the dimensions of the queries and keys, to implement scaled dot product attention. Thus, for example, an output of the attention mechanism may be determined as $$\text{softmax}\left(\frac{QK^T}{\sqrt{d}}\right)V$$

where d is a dimension of the key (and value) vector. In another implementation the attention mechanism be comprise an "additive attention" mechanism that computes the compatibility function using a feed-forward network with a hidden layer. The output of the attention mechanism may be further processed by one or more fully-connected, feed forward neural network layers.

The attention mechanism may implement multi-head attention, that is, it may apply multiple different attention mechanisms in parallel. The outputs of these may then be combined, e.g. concatenated, with a learned linear transformation applied to reduce to the original dimensionality if necessary.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

obtaining an input image;

processing the input image using an image encoder neural network that has been trained to process the input image to generate an image sequence of image embedding vectors characterizing the input image;

generating an input sequence of input embedding vectors that includes the image sequence of image embedding vectors; and processing the input sequence of input embedding vectors that includes the image sequence of image embedding vectors using a trained language model neural network to generate as output an output sequence of text tokens that represents a text response to the input sequence of input embedding vectors, wherein:

each text token in the output sequence is selected from a vocabulary of text tokens, the trained language model neural network has been trained to perform a language modeling task on training input sequences of text embedding vectors that represent text tokens from the vocabulary of text tokens, each image embedding vector in the image sequence of image embedding vectors has a same dimensionality as the text embedding vectors that represent the text tokens from the vocabulary of text tokens, the language model neural network is an auto-regressive Transformer-based neural network that comprises a plurality of self-attention layers and that auto-regressively generates the output sequence of text tokens by generating each particular text token in the output sequence conditioned on a current input sequence that includes (i) the input sequence of input embedding vectors followed by text embedding vectors of any text tokens that precede the particular text token in the output sequence, and wherein the language model neural network is configured to apply relative position encodings to the input sequence when processing the input sequence using the plurality of layers.

2. The method of claim 1, wherein:

the image encoder neural network has been trained by backpropagating gradients of a loss function with respect to the parameters of the image encoder neural network through the trained language model neural network, and the loss function is a loss function for a multi-modal task that requires generating a training output text sequence comprising a plurality of text tokens by processing, using the trained language model neural network, a training input comprising a sequence of training image embedding vectors generated by the image encoder neural network from a training image.

3. The method of claim 2, wherein the multi-modal task is an image captioning task, and wherein the training output text sequence is at least a portion of a text caption for the training image.

4. The method of claim 2, wherein the trained language model neural network is not trained during the training of the image encoder neural network on the loss function for the multi-modal task, and wherein the training of the image encoder neural network comprises backpropagating the gradients of the loss function through the trained language model neural network and into the image encoder neural network without adjusting parameters of the language model neural network.

5. The method of claim 2, wherein the loss function measures respective likelihoods assigned to text tokens in a ground truth text output for the multi-modal task by score distributions over the text tokens in the vocabulary of text tokens generated by the trained language model neural network as a result of processing the training input.

6. The method of claim 2, wherein the trained language model neural network has been trained on the language modeling task prior to the training of the image encoder neural network on the loss function for the multi-modal task.

7. The method of claim 1, wherein the image encoder neural network comprises a convolutional neural network.

8. The method of claim 7, wherein the convolutional neural network is configured to process the input image to generate an output tensor characterizing the input image, and wherein the image encoder neural network is configured to map the output tensor to the image sequence of image embedding vectors.

9. The method of claim 1, wherein the output sequence of text tokens represents at least a portion of predicted text caption for the input image.

10. The method of claim 1, wherein the input sequence of input embedding vectors also comprises (i) one or more sequences of text embedding vectors that each represent a respective text sequence, (ii) one or more other sequences of image embedding vectors that each characterize another input image, or (iii) both.

11. The method of claim 10, wherein the input sequence of input embedding vectors comprises the image sequence of image embedding vectors and a sequence of text embedding vectors that represents a question about the input image, and wherein the output sequence of text tokens represents a predicted text answer to the question about the input image.

12. The method of claim 10, wherein the input sequence of input embedding vectors comprises (i) one or more other sequences of image embedding vectors and (ii) for each other sequence of image embedding vectors, a respective sequence of text embedding vectors that represents a classification for the other image characterized by the other sequence of image embedding vectors, and wherein the output sequence of text tokens represents a predicted classification for the input image.

13. The method of claim 10, wherein the input sequence of input embedding vectors comprises (i) one or more other sequences of image embedding vectors each characterizing a respective additional input image, and (ii) for each other sequence of image embedding vectors, a respective sequence of text embedding vectors that represents an answer to a question when asked about the additional image characterized by the other sequence of image embedding vectors, and wherein the output sequence of text tokens represents a predicted answer to the question when asked about the input image.

14. The method of claim 10, wherein the input sequence of input embedding vectors comprises (i) one or more other sequences of image embedding vectors each characterizing a respective additional input image, (ii) for each other sequence of image embedding vectors, a respective sequence of text embedding vectors that provides a particular type of information about the additional image characterized by the other sequence of image embedding vectors, and (iii) for the image sequence of image embedding vectors, a partial sequence of text embeddings that represents a text prompt to provide the particular type of information about the input image, and wherein the output sequence of text tokens represents a predicted completion of the text prompt that provides the particular type of information about the input image.

15. The method of claim 10, wherein the input sequence of input embedding vectors comprises a first sequence of text embedding vectors that represent a text sequence that describes a task that should be performed by the text response represented by the output sequence.

16. A system comprising:

one or more computers; and one or more storage devices storing instructions that, when executed by the one or more computers, cause the one or more computers to perform operations comprising:

obtaining an input image;

processing the input image using an image encoder neural network that has been trained to process the input image to generate an image sequence of image embedding vectors characterizing the input image;

generating an input sequence of input embedding vectors that includes the image sequence of image embedding vectors; and processing the input sequence of input embedding vectors that includes the image sequence of image embedding vectors using a trained language model neural network to generate as output an output sequence of text tokens that represents a text response to the input sequence of input embedding vectors, wherein:

each text token in the output sequence is selected from a vocabulary of text tokens, the trained language model neural network has been trained to perform a language modeling task on training input sequences of text embedding vectors that represent text tokens from the vocabulary of text tokens, and each image embedding vector in the image sequence of image embedding vectors has a same dimensionality as the text embedding vectors that represent the text tokens from the vocabulary of text tokens, the language model neural network is an auto-regressive Transformer-based neural network that comprises a plurality of self-attention layers and that auto-regressively generates the output sequence of text tokens by generating each particular text token in the output sequence conditioned on a current input sequence that includes (i) the input sequence of input embedding vectors followed by text embedding vectors of any text tokens that precede the particular text token in the output sequence, and wherein the language model neural network is configured to apply relative position encodings to the input sequence when processing the input sequence using the plurality of layers.

17. The system of claim 16, wherein:

the image encoder neural network has been trained by backpropagating gradients of a loss function with respect to the parameters of the image encoder neural network through the trained language model neural network, and the loss function is a loss function for a multi-modal task that requires generating a training output text sequence comprising a plurality of text tokens by processing, using the trained language model neural network, a training input comprising a sequence of training image embedding vectors generated by the image encoder neural network from a training image.

18. The system of claim 17, wherein the multi-modal task is an image captioning task, and wherein the training output text sequence is at least a portion of a text caption for the training image.

19. The system of claim 17, wherein the trained language model neural network is not trained during the training of the image encoder neural network on the loss function for the multi-modal task, and wherein the training of the image encoder neural network comprises backpropagating the gradients of the loss function through the trained language model neural network and into the image encoder neural network without adjusting parameters of the language model neural network.

20. One or more non-transitory computer-readable storage media storing instructions that when executed by one or more computers cause the one or more computers to perform operations comprising:

obtaining an input image;

processing the input image using an image encoder neural network that has been trained to process the input image to generate an image sequence of image embedding vectors characterizing the input image;

generating an input sequence of input embedding vectors that includes the image sequence of image embedding vectors; and processing the input sequence of input embedding vectors that includes the image sequence of image embedding vectors using a trained language model neural network to generate as output an output sequence of text tokens that represents a text response to the input sequence of input embedding vectors, wherein:

each text token in the output sequence is selected from a vocabulary of text tokens, the trained language model neural network has been trained to perform a language modeling task on training input sequences of text embedding vectors that represent text tokens from the vocabulary of text tokens, and each image embedding vector in the image sequence of image embedding vectors has a same dimensionality as the text embedding vectors that represent the text tokens from the vocabulary of text tokens, the language model neural network is an auto-regressive Transformer-based neural network that comprises a plurality of self-attention layers and that auto-regressively generates the output sequence of text tokens by generating each particular text token in the output sequence conditioned on a current input sequence that includes (i) the input sequence of input embedding vectors followed by text embedding vectors of any text tokens that precede the particular text token in the output sequence, and wherein the language model neural network is configured to apply relative position encodings to the input sequence when processing the input sequence using the plurality of layers.

* * * * *